United States Patent [19]

Feimer et al.

[11] Patent Number: 4,962,270

[45] Date of Patent: Oct. 9, 1990

[54] MULTI-STAGE PERVAPORATION PROCESS RUN AT PROGRESSIVELY HIGHER VACUUM, HIGHER TEMPERATURE OR BOTH AT EACH SUCCESSIVE RETENTATE STAGE

[75] Inventors: Joseph L. Feimer, Bright's Grove, Canada; Robert C. Schucker; Charles P. Darnell, both of Baton Rouge, La.

[73] Assignee: Exxon Research and Engineering Company, Florham Park, N.J.

[21] Appl. No.: 315,867

[22] Filed: Feb. 27, 1989

[51] Int. Cl.$^5$ .............................................. C02F 1/44
[52] U.S. Cl. ................................ 585/819; 208/308; 210/640; 210/641; 55/158; 55/342
[58] Field of Search ............... 208/308; 585/818, 819; 210/637, 640, 641; 55/158, 342, 343

[56] References Cited

U.S. PATENT DOCUMENTS

| | | | |
|---|---|---|---|
| 2,923,749 | 2/1960 | Lee et al. | 260/674 |
| 2,947,687 | 8/1960 | Lee | 210/23 |
| 2,985,588 | 5/1961 | Benning et al. | 210/23 |
| 3,043,891 | 7/1972 | Stuckey | 260/674 |
| 3,062,905 | 11/1962 | Jennings et al. | 260/674 |
| 3,370,102 | 2/1968 | Carpenter et al. | 585/818 |
| 3,398,091 | 8/1968 | Greatorex | 210/23 |
| 3,520,803 | 7/1970 | Iaconelli | 210/23 |
| 4,397,661 | 8/1983 | King et al. | 55/344 X |
| 4,478,719 | 10/1984 | Michele et al. | 55/158 X |
| 4,650,574 | 3/1987 | Hilgendorff et al. | 210/180 |

OTHER PUBLICATIONS

"Industrial Application of Membrane Technology", A. Walch, International Chemical Engineering, vol. 17, No. 3, pp. 425-430 Jul. 1977.
"Progress in Separation and Purification", vol. 1, Michaels et al, Interscience Publishers, 1968 pp. 180-186.

Primary Examiner—Glenn Caldarola
Attorney, Agent, or Firm—Joseph J. Allocca

[57] ABSTRACT

Improved separation of feed streams containing multiple components is effected by means of a multi membrane staged pervaporation process wherein each membrane stage is series is run as progressively higher temperature, stronger vacuum or both than the preceding stage. This process is especially useful for separating components from wide boiling range mixtures.

5 Claims, 2 Drawing Sheets

MULTI-STAGE PERVAPORATION PROCESS RUN AT PROGRESSIVELY HIGHER VACUUM, HIGHER TEMPERATURE OR BOTH AT EACH SUCCESSIVE RETENTATE STAGE

BRIEF DESCRIPTION OF THE INVENTION

The present invention is directed to a multi-stage pervaporation process wherein each successive stage, which may contain one membrane unit or multiple membrane units run either in series or in parallel is run at a progressively stronger vacuum, a progressively higher temperature or both than the preceding stage. This process allows a multi component mixture to be membrane separated into multiple fractions of different molecular type and of different boiling point. In the process, the feed is initially heated to an appropriate temperature and fed to a membrane pervaporation stage operated at low (i.e., weak) vacuum in order to produce a permeate and a retentate. The retentate, either as is or with any additionally needed heating to replace the lost heat of evaporation from the first stage (i.e. at isothermal conditions) or alternatively heated to a higher temperature than the initial temperature, is then fed to a second pervaporation stage operated at a higher vacuum than stage 1 to yield a second permeate and a second retentate. Alternatively if the retentate from each stage prior to being sent to the next succeeding stage is heated to a temperature higher than that of the preceding stage, the vacuum employed in the succeeding stage can be the same as that of the preceding stage, that is, the process can be run at isobaric conditions Preferably both the temperature and the pressure are increased in each succeeding stage.

Any number of stages (n) can be employed with the retentate from stage n−1 being the feed to stage n run at a higher vacuum, a higher temperature or both than that used at stage n−1. The lighter, lower boiling components are thus recovered as permeate in the initial stages, and the heavier components are recovered in the later stages. The maximum operating temperature and vacuum are set with due regard paid to the nature of the heaviest component to be recovered as well as the mechanical limits of the membranes used in the pervaporation stages.

BACKGROUND OF THE INVENTION

The separation of components from mixtures using membranes has become an accepted form of separations technology in the literature. Processes such as reverse osmosis, dialysis, ultrafiltration, pervaporation, perstraction, forward osmosis, etc. have been described. The use of multiple membrane stages in membrane separation processes has also been described.

Thus, in U.S. Pat. No. 2,923,749, a process for separating organic compounds is described—a process especially useful for separating aromatics from non-aromatics. In the process, the feed is sent to a membrane separation zone preferably operated under a vacuum (pervaporation) to yield a permeate and a retentate. A number of permeation zones may be used. When the concentration of the components therein is suitable, permeate and retentate may be recycled to the various stages.

U.S. Pat. No. 2,947,687 describes hydrocarbon separation by the use of a permeation membrane operated under perstraction or pervaporation conditions. By using a sweep gas or by maintaining the permeate zone at sub atmospheric pressure, permeate is removed from the permeation zone. Retentate from one separation stage can be used as the feed to subsequent membrane separation zones. In the Example each permeation stage is maintained at the same vacuum level—about 100 mm Hg abs. Each successive stage is employed to remove additional quantities of the same component. See also U.S. Pat. No. 3,043,891.

U.S. Pat. No. 2,985,588 describes a membrane permeation separation technique which provides trouble free start-up and shut down procedures. In the process the permeation temperature is maintained between the softening point transition temperature and not higher than 20° C. above the first order transition temperature displayed by the plastic membrane; the mixture of molecules in the feed zone is maintained in the liquid state; the mixture of molecules in the permeate zone is maintained in the vapor state; the absolute pressure in the permeate zone is maintained at less than one-half (e.g., one-tenth) of the vapor pressure normally exerted by the mixture in the permeate zone. In the Example supporting the description of the figures a hydrocarbon mixture containing 50% benzene is sent to a membrane unit at about 90° C. The retentate containing about 23% benzene (the remainder being other hydrocarbons) is sent to a second membrane unit at about 110° C. This higher temperature can be employed because of the lower concentration of benzene present in the feed to the second membrane unit. The retentate from this unit containing about 7.5% benzene (the remainder being other hydrocarbons) is sent to a third membrane unit after being heated to about 120° C. This higher temperature is permissible because of the lower concentration of benzene present in the feed to this third membrane unit.

In this patent temperature staging is used to separate benzene from a mixture of benzene with other hydrocarbons. The patent does not show that temperature staging can be used to fractionate a multi-component feed mixture into numerous fractions of different molecular types and different boiling points, the earlier stages containing a majority of the lighter simpler, lower boiling components and the later stages containing the heavier more complex higher boiling components.

THE PRESENT INVENTION

Figure 1:
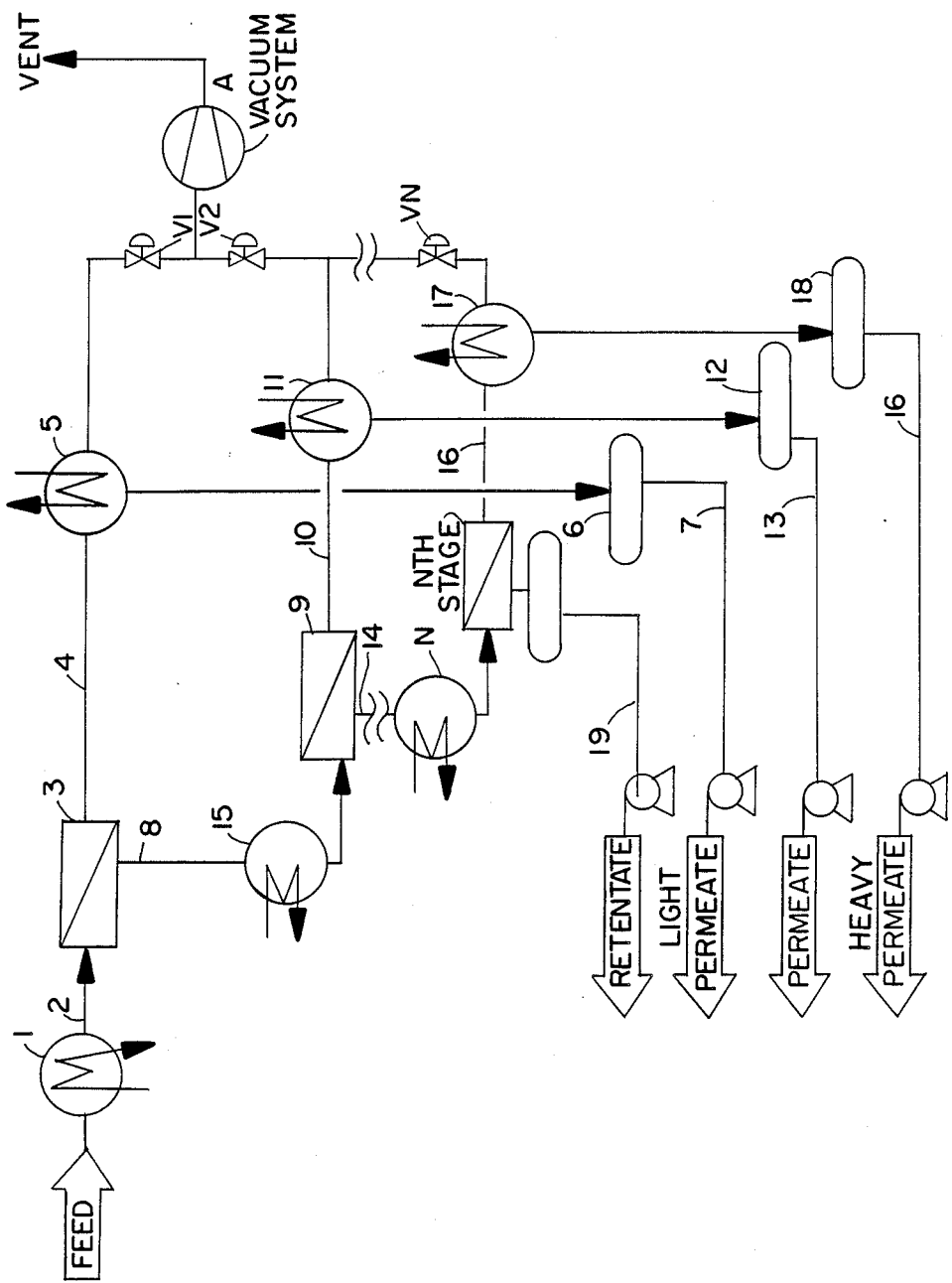
FIG. 1 is a schematic of an embodiment of the present invention containing multiple membrane pervaporation stages.

The present invention is a process for separating feed streams containing multiple components. The process employs a multi-membrane staged pervaporation scheme wherein each stage may contain one membrane unit or multiple membrane units run either in series or in parallel and wherein each membrane stage in series is run at a progressively stronger vacuum, higher temperature or both. The process is especially useful for separating components from wide boiling range mixtures.

In the process of the present invention, a multi-component feed is fed to a first membrane stage. The feed is heated to a temperature appropriate for the lightest, lowest boiling component of the feed. The first membrane pervaporation stage is run at a low vacuum. A first permeate of light, lower boiling material is recovered, and a retentate is produced. This retentate is fed to a second membrane pervaporation stage which is run at a higher temperature, a stronger vacuum or both than the preceding stage. In this second stage a second permeate is recovered which is heavier and higher boiling than the permeate of the preceding stage. A second retentate is also produced which is fed to a third membrane pervaporation stage which is run at a still higher temperature, a higher vacuum or both than the preceding second stage. In each of these retentate cascade steps, when run at successively higher vacuum, the retentate can be fed to the next succeeding stage as it comes from the preceding stage or it can be at least subjected to interstage reheat to make up for heat lost due to evaporation of the permeate in the preceding stages such conditions being called isothermal conditions. Alternatively, the retentate can be fed to the next succeeding stage at a temperature higher than the preceding stage but the succeeding stage is run at the same vacuum pressure as the preceding stage. Optimally, the amount of heat supplied in each heating/reheating is enough to evaporate the desired permeate for that particular stage and the heating is, therefore, to a temperature higher than in the preceding zone while each stage is run at a successively greater vacuum than the preceding stage. The maximum amount of heat which can be employed is determined by the mechanical maximum operating temperature of the membrane at the vacuum employed at the particular stage running at this temperature.

The process of the present invention may employ as many membrane pervaporation stages as there are recoverable components or fractions in the initial feed. The only requirement is that the temperature, vacuum or both used in stage n be greater than the vacuum in the preceding stage n−1. Different membranes can be employed in each stage in order to obtain the optimum performance.

Because each stage is run using only as much vacuum, heat or both as necessary to pervaporate a particular component or narrow range of components, the condensers associated with each stage can be scaled and powered accordingly. Thus, in the initial stages run at minimal heat and low vacuum, the permeate condensers can use cooling water. The later stages, run at higher temperatures, successively higher vacuums or both can still use cheap cooling water condensers because the heavier permeated components are more easily condensed than the lighter ones evaporated in the earlier stages. This scheme, wherein only cheap cooling water condensers are needed is much more economical than current schemes which use single pervaporation units to perform broad cut separations of feeds and therefore require expensive refrigerated condensers to condense the lighter components.

The process of the present invention is useful for separating complex multi component feeds, especially those having a wide boiling range. It has special utility in those instances where different components of a stream possess approximately the same boiling point so traditional distillation cannot be used. Thus, for example, in fractionating catalytic naphthas containing mixtures of aromatics and non-aromatics, the present process can be used to recover a number of fractions of aromatics as permeates boiling at different temperatures. Non-aromatics boiling at substantially the same temperature as the aromatics are not permeated and remain in the retentate fractions.

Because the pervaporation process of the present invention can be used to separate feeds on the basis of both molecular type and boiling point, the present pervaporation process combines the benefit of both distillation and membrane separation in a single process. One process can be used in place of two, thereby simplifying material handlings and energy requirements.

In practicing the process of the present invention the different pervaporation units may employ the same or different membranes depending on the separation desired at each stage.

In separating aromatics from non aromatics various membranes can be employed U.S. Pat. Nos. 2,923,749, 2,947,687, 3,043,891 and 2,985,588 suggest the use of various cellulose esters, cellulose ethers, and mixed cellulose esters and ethers and irradiated polyethylene as useable membranes. The membranes can be used as such or they can have their permeability increased by using various diluents or feed additives such as oxygenated hydrocarbons, halogenated hydrocarbons, sulfur containing organic compounds, nitrogen containing organic compounds etc. U.S. Pat. No. 4,115,465 teaches polyurethane membranes for use in the pervaporative separation of aromatics from various non aromatic compounds Recently polyurea-urethane membranes have been described as useful for aromatic-non-aromatic separations under pervaporation conditions The membranes are described in copending application U.S. Ser. No. 108,821 and U.S. Ser. No. 108,822, both assigned to the same assignee as the present invention.

U.S. Ser. No. 108,822 teaches a particular polyurea-urethane membrane for aromatic-non aromatic separation. The membrane is made from a polyurea-urethane copolymer characterized by possessing a urea index of at least 20% but less than 100%, an aromatic carbon content of at least about 15 mole %, a functional group density of at least about 10 per 1000 grams of polymer and a C=/NH ratio of less than 8.0. Such polyurea-urethane membranes are preferably anisotropic in nature. The production of such anisotropic membranes is taught in U.S. Ser. No. 108,821. The membranes are prepared from the corresponding co-polymer by synthesizing the copolymer in a good solvent containing less than 5 vol % non-solvent, producing a film of this polymer solution on a support with a maximum pore size less than 20 microns, subjecting the film to conditions such that the solvent vapor pressure-time factor is 1000 mm Hg min. or less and quenching the membrane film in a non-solvent yielding the anisotropic membrane. Pervaporation processes preferably use membranes in the form of hollow fibers. Hollow fibers of the above described polyurea-urethane polymer can be made by using hollow fibers of regenerated cellulose as the support on which the polymer is deposited, subjecting the film to conditions resulting in the proper solvent vapor pressure-time factor, preferably immediately quenching the fiber in a non-solvent.

The invention will be better understood by reference to the FIG. 1 which presents a particular, non limiting embodiment.

The multi component feed to be separated into selected components is passed through heater (1) and heated to a temperature $T_1$ sufficient to provide the necessary heat to evaporate the desired boiling range permeate. The heated feed is passed via line (2) to the first pervaporative membrane unit (3) where it is subject to a low vacuum sufficient to draw off the light, low boiling permeate. The vacuum is produced by vacuum pump (A). The amount of vacuum applied to each membrane unit is controlled by valves ($V_1$ and $V_2 \ldots V_N$ shown in the figure). This permeate is passed through line (4) to chiller (5) where it is condensed and sent to permeate storage vessel (6). This permeate can be sent via line (7) to further processing, treatment or blending units (not shown). The retentate from membrane unit 3 is passed via line (8) to the second membrane unit (9). The retentate in line 8 can be sent to the second membrane unit (9) directly or it can first be passed through a heater (15) wherein heat lost in stage 1 membrane unit to evaporation is replaced or the retentate is heated to a temperature $T_2$ sufficient to provide the heat of evaporation of the next lightest, higher boiling component present in the retentate. In stage 2 membrane unit (9) the retentate from stage 1 is subjected to the same or a higher vacuum than that in stage 1 membrane unit 3 producing a second permeate passed via line (10) to cooler (11) for storing in permeate storage vessel (12). This permeate can be passed via line (13) to further processing, treatment or blending units (not shown).

The retentate from stage 2 membrane unit (9) is passed via line (14) through a series of stages until the highest desired boiling component is recovered. The retentate from heater n is passed to stage n membrane unit wherein it is subjected to the highest vacuum used in the process to produce a final permeate stream (16) passed through chiller (17) and sent to permeate vessel (18). The retentate, containing the non-permeating species of the feed is sent via line 19 for treatment, processing, blending etc. not shown.

Figure 2:
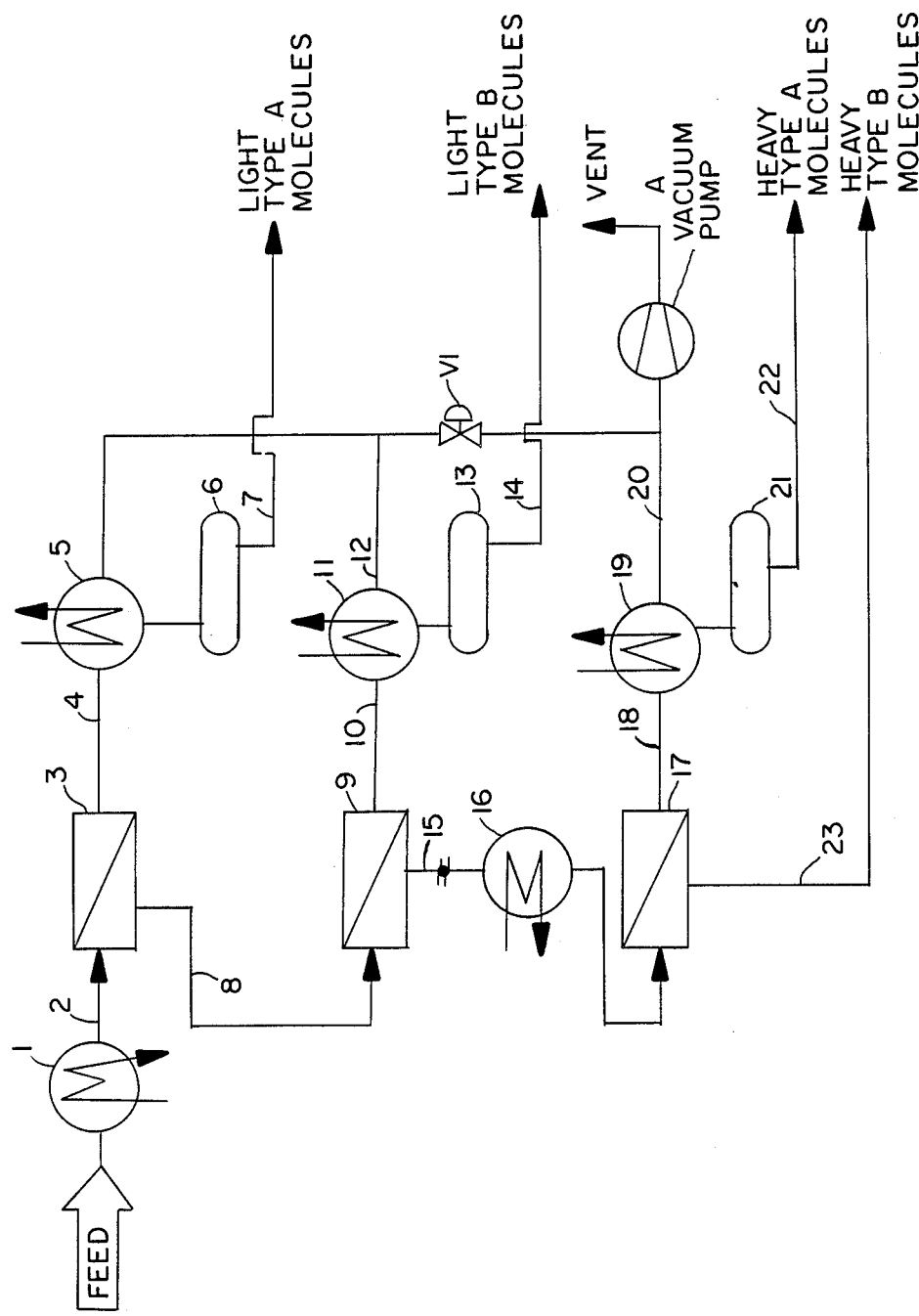
FIG. 2 is a schematic of an embodiment of the present invention functioning as a multi-staged membrane distillation unit.

FIG. 2 describes a multi-stage membrane distillation unit in which molecules can be separated by boiling point as well as molecular type. A multicomponent feed to be separated into selected components is passed through heater (1) and heated to a temperature T1 sufficient to provide the necessary heat to evaporate the desired boiling range permeate. The heated feed is passed via line (2) to the first pervaporative membrane unit (3) in stage 1 housing membrane A which selectively permeates type A molecules. This permeate is passed through line (4) to chiller (5) where it is condensed and sent to permeate storage vessel (6). This permeate can be sent via line (7) to further processing, treatment or blending units (not shown). The retentate from membrane unit (3) is sent via line (8) to the second membrane unit (9) in stage 1 which houses membrane B which selectively permeates type B molecules. A heater (not shown) can be employed prior to unit 9 if required. The permeate from unit 9 is passed through line (10) to chiller (11) where it is condensed and sent to permeate storage vessel (13). This permeate can be sent via line (14) to further processing, treatment or blending units. Any number of membrane units housing different membranes which are selective to different molecular types can be employed. All the membrane units in stage 1 are subjected to a vacuum sufficient to draw off the light low boiling permeate. The vacuum is produced by a vacuum generating system (i.e., vacuum pump, steam ejector).

The retentate from the stage 1 membrane units is passed via line 15 through a series of stages until the highest desired boiling component is recovered. The retentate from heater 16 is passed to membrane unit 17 in stage n wherein it is subjected to the highest vacuum used in the process to produce a final permeate stream (18) passed through chiller (19) and sent to permeate vessel (21). This permeate can be sent via line (22) to further processing, treatment or blending units. All membrane units are subjected to a vacuum produced by a vacuum pump, the vacuum being delivered to the membrane units via lines 12 and 20 and regulated by means of valve VI. The retentate, containing the non-permeating species of the feed to membrane unit 17 is sent via line 23 for further treatment or processing.

What is claimed is:

1. A process for separating a multi-component feed stream into fractions of different molecular type and of different boiling point comprising feeding the multi-component feed stream to a multi-stage membrane pervaporation separation unit, the multi-component stream being the feed to a first separation stage producing a permeate and a retentate, the retentate from the first and each succeeding stage in turn being the feed to the next succeeding separation stage wherein the retentate which constitutes the feed to the next succeeding stage is heated to a temperature higher than that used in the preceding stage and wherein each succeeding permeation stage is run at a higher vacuum than that used in the preceding permeation stage to thereby fractionate the multi-component stream into numerous fractions of different molecular type and different boiling point.

2. A process for separating a multi-component feed stream into fractions of different molecular type and of different boiling point comprising feeding the multi-component feed stream to a multi-stage membrane pervaporation separation unit run at isothermal conditions wherein the multi-component stream is fed to a first membrane pervaporation separation stage run at a vacuum sufficient to recover the lightest component as a permeate and produce a retentate, the retentate from the first and each succeeding separation stage of the multi-stage separation unit constituting the feed to the next succeeding separation stage wherein each succeeding separation stage is run at a higher vacuum than the preceding separation stage to thereby fractionate the multi-component stream into numerous fractions of different molecular type and different boiling point.

3. A process for separating a multi-component feed stream into fractions of different molecular type and of different boiling point comprising feeding the multi-component feed stream to a multi-stage membrane pervaporation separation unit run at constant vacuum wherein the feed to a first membrane pervaporation separation stage is heated to a temperature sufficient to provide the heat of vaporization of the lightest component of the multi-component feed stream to produce a permeate and a retentate and wherein the retentate from the first and each succeeding separation stage of the multi-stage separation unit which constitutes the feed to the next succeeding separation stage is heated to a temperature higher than that employed in the preceding separation stage to thereby fractionate the multi-component steam into numerous fractions of different molecular type and different boiling point 4. The method of claim 1, 2 or 3 wherein the multi-component feed stream is a mixture of aromatic hydrocarbons and non-aromatic hydrocarbons.

5. The method of claim 4 wherein the membrane used in each separation stage is the same or different and selected from membranes made of cellulose esters, cellulose ethers, combinations of cellulose esters and ethers, polyurea-urethane copolymers.

* * * * *